United States Patent [19]

Yano et al.

[11] Patent Number: 4,555,468

[45] Date of Patent: Nov. 26, 1985

[54] PHOTOSENSITIVE DIAZONIUM MATERIAL WITH PRECOAT OF GRAFT POLYMER PREPARED BY GRAFTING CELLULOSE DERIVATION WITH RADICAL POLYMERIZABLE MONOMER

[75] Inventors: Takashi Yano, Amagasaki; Masahiro Asami, Himeji, both of Japan

[73] Assignee: Daicel Chemical Industries, Ltd., Osaka, Japan

[21] Appl. No.: 605,727

[22] Filed: May 1, 1984

[30] Foreign Application Priority Data

May 4, 1983 [JP] Japan ................................. 58-77567
May 18, 1983 [JP] Japan ................................. 58-87111
May 18, 1983 [JP] Japan ................................. 58-87112

[51] Int. Cl.$^4$ ......................... G03C 1/80; G03C 1/76
[52] U.S. Cl. ................................... 430/160; 430/157; 430/163; 430/169; 430/176; 430/531; 430/533; 430/534; 430/535
[58] Field of Search ............... 430/160, 163, 168, 169, 430/176, 531, 533, 534, 535, 157

[56] References Cited

U.S. PATENT DOCUMENTS

| 2,980,534 | 4/1961 | Printy et al. ........................ 430/176 |
| 3,203,803 | 8/1965 | Habib et al. ........................ 430/163 |
| 3,362,825 | 1/1968 | Moskowitz et al. ................ 430/160 |
| 3,660,097 | 5/1972 | Mainthia ............................. 430/176 |
| 3,708,296 | 1/1973 | Schlesinger ........................ 430/176 |
| 4,131,468 | 12/1978 | Rennison et al. ................... 430/160 |
| 4,154,614 | 5/1979 | Tsunoda et al. .................... 430/169 |
| 4,275,137 | 6/1981 | Verhoof .............................. 430/160 |
| 4,457,997 | 7/1984 | Thoese et al. ....................... 430/160 |

FOREIGN PATENT DOCUMENTS 1169227 10/1969 United Kingdom ................ 430/160

*Primary Examiner*—Charles L. Bowers, Jr.
*Attorney, Agent, or Firm*—Flynn, Thiel, Boutell & Tanis

[57] ABSTRACT

A photosensitive material of the diazonium type which comprises a support, a precoat layer thereon and a photosensitive layer of a diazonium compound is improved by using a graft copolymer on a cellulose derivative as the precoat layer. A hydrophilic epoxy compound may be used in the precoat layer and a coupler and a benzenediazonium hexafluorophosphate derivative may be used in the photosensitive layer.

10 Claims, No Drawings

PHOTOSENSITIVE DIAZONIUM MATERIAL WITH PRECOAT OF GRAFT POLYMER PREPARED BY GRAFTING CELLULOSE DERIVATION WITH RADICAL POLYMERIZABLE MONOMER

The invention relates of a photosensitive material of the diazonium type, which comprises a support, a precoat layer thereon and a photosensitive layer of a diazonium compound. More in particular, it relates to improvement of the photosensitive material which is characterized by using a graft copolymer on a cellulose derivative as the precoat layer. In addition, the invention may use a hydrophilic epoxy compound in the precoat layer and use a coupler and a benzenediazonium hexafluorophosphate derivative in the photosensitive layer.

The precoat layer is provided essentially for the purpose of firmly adhering a photosensitive layer on a support without damaging photographic properties of the diazo reproducing material such as image density characteristics and contrast.

However, when a conventional precoating resin is used, the precoat layer provided on a support cannot adhere firmly to a photosensitive layer provided on the precoat layer, so that the face strength is not always sufficient and devitrification is caused in the developing step in some cases.

In addition, the shelf life of the reproducing material is seriously deteriorated by an interaction between the precoating resin and the photosensitive composition to cause so-called precoupling.

The present invention has been completed based on investigations made for the purpose of overcoming the defects of the conventional materials.

The present invention provides a diazo reproducing material comprising a precoat layer and a diazophotosensitive layer provided on a support, characterized in that the precoat layer contains a graft polymer obtained by polymerizing at least one polymerizable monomer in the presence of a cellulose derivative. An object of the invention is to provide a diazo reproducing material having excellent adhesion between the support and the photosensitive layer and a high face strength. The reproducing material is free from devitrification in the developing step and its photographic properties are quite stable.

The cellulose derivatives used in the process of the present invention include, for example, cellulose esters such as cellulose acetate, cellulose acetate propionate, cellulose acetate butyrate, cellulose nitrate and cellulose sulfate and cellulose ethers such as ethylcellulose and benzylcellulose. Among these cellulose derivatives, cellulose esters are preferred, since they are easily available on the market and can be easily handled. Particularly, cellulose acetate propionate and cellulose acetate butyrate are preferred, since a quite excellent adhesion between the support and the photosensitive layer and a high face strength can be obtained and the devitrification in the developing step can be prevented by employing a precoat layer containing such an ester. These cellulose derivatives may be used either alone or as a mixture of two or more of them.

The polymerizable monomers to be used in the present invention are those capable of forming graft polymers in the presence of the cellulose derivative by a known process. Typical examples of them are the following radical-polymerizable monomers:

(1) acrylic or methacrylic esters of the general formula:

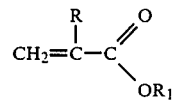

wherein R represents a hydrogen atom or a methyl group and $R_1$ represents an alkyl group having 1 to 20 carbon atoms, a cycloalkyl group having 3 to 4 carbon atoms, a methoxybutyl, ethoxybutyl, phenyl, benzyl or allyl group, a hydroxyalkyl group having 2 or 3 carbon atoms, a dicyclopentynyl or polyalkylene glycol group, (2) acrylic or methacrylic amides such as acrylamide, N-methylolacrylamide and N-alkoxyacrylamides, (3) vinylaromatic compounds of the following general formula:

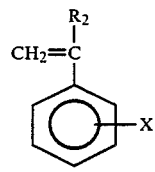

wherein $R_2$ represents a hydrogen atom or a methyl group and X represents a hydrogen or halogen atom or a methyl, nitro, amino, N-dialkylamino or chloromethyl group, (4) vinyl monomers having a functional group such as glycidyl methacrylate, glycidyl acrylate, allyl glycidyl ether, acryloyl chloride, methacryloyl bromide, acrylic acid, methacrylic acid, maleic anhydride and fumaric acid, and (5) other polymerizable monomers such as vinyl acetate, ethylene, butadiene, chloroprene, isoprene, acrylonitrile, vinyl chloride and vinyl carboxylate.

The graft polymer of the present invention may be prepared from 1 to 30 wt. % of the cellulose derivative and 99 to 70 wt. % of at least one polymerizable monomer. When the amount of the cellulose derivative is smaller than 1 wt. % or larger than 30 wt. %, the resulting graft polymer does not exhibit sufficient properties required of the precoat layer of the diazo reproducing material. The process for the production of the graft polymer is not particularly limited. The graft polymer to be used in the present invention may be obtained by a known process for polymerizing a radical-polymerizable monomer in the presence of a cellulose derivative such as a process disclosed in Fumio Ide, "Graft Jugo to sono Ôyo" published by Kobunshi Kankôkai in 1977, "Kobunshi Jikkengaku, Vol. 6, Kobunshi Hanno" edited by Kobunshi Gakkai, Kobunshi Jikkengaku Henshû Iinkai and published by Kyôritsu Shuppan in 1978, pp. 148 to 189 or "Kôbunshi Kakô" Vol. 23, November, published by Kôbunshi Kankôkai in 1974, pp. 519 to 525 and processes disclosed in the specifications of Japanese Patent Laid-Open Nos. 37683/1975, 48032/1975, 21225/1978, 117516/1982 and 207608/1982.

Preferably the graft polymer being used in the present invention comprises the cellulose derivatives all of which are bonded with the polymerizable monomers. However, the graft polymer may contain also a small amount the free cellulose derivative not bonded with the polymerizable monomer or a polymer comprising only the polymerizable monomer.

The graft polymer may be used not only as such but also as solution, dispersion or emulsion thereof. The thus obtained liquid mixture is applied onto the support at a rate of preferably about 1 to 3 g/m² (as solid) by a known application method.

The drying conditions may be those generally employed in the art. For example, the drying is effected at 50° to 150° C. for 5 to 60 min.

The graft copolymer to be used in forming the precoat layer according to the present invention may contain also an amino resin, epoxy compound or polyisocyanate compound as a crosslinking agent. To facilitate the reaction of the graft polymer with the crosslinking agent, it is preferred to use as the radical-polymerizable monomer a monomer containing a hydroxyl, amidomethylol, carboxyl or glycidyl group, such as hydroxyethyl acrylate, hydroxyethyl methacrylate, hydroxypropyl acrylate, hydroxypropyl methacrylate, polyethylene glycol monomethacrylate, polypropylene glycol methacrylate, methylol methacrylate, acrylic acid, methacrylic acid, crotonic acid, fumaric acid, maleic acid, glycidyl methacrylate or glycidyl acrylate.

The crosslinking agents usable in the present invention are compounds containing at least two functional groups reactive with at least one of the hydroxyl, amidomethylol, carboxyl and glycidyl groups which compounds are reactive with the graft polymer. The crosslinking agents include, for example, amino resins, epoxy compounds and polyisocyanate compounds. The amino resins are particularly preferred, since they are available on a commercial base at a relatively low cost and, in addition, they can be handled easily.

The amino resins usable in the invention include, for example, hexamethoxymethylmelamine, methoxybutylmelamine, methoxymethylated or methoxybutylated urea and guanamine.

The graft polymer is mixed with the crosslinking agent by means of an agitating mixer such as Disper Mill by a known mixing method prior to the formation of the primer layer. The mixing weight ratio of the crosslinking agent to the graft copolymer is determined suitably depending on the variety of the crosslinking agent. For example, the ratio of the graft polymer to the amino resin is about 95 to 60/5 to 40 and the ratio of the graft polymer to the epoxy compound is about 99.5 to 90/0.5 to 10.

As above mentioned, the invention is characterized by using the graft copolymer on a cellulose derivative in the way of material for the precoat layer.

According to the invention, the precoat layer may further contains an epoxy compound. This preferable embodiment will be illustrated below.

The hydrophilic epoxy compounds to be used in the present invention serve as a crosslinking agent reactive with the graft copolymer. Generally, the cellulose derivatives have alcoholic hydroxyl groups remaining unesterified or unetherified and, therefore, it is unnecessary in many cases to further introduce a functional group reactive with the epoxy group. To obtain a high reactivity with the epoxy group, however, a functional group reactive with the epoxy group may be introduced into the cellulose derivative moiety or the polymer moiety comprising radical-polymerizable monomers grafted onto the cellulose derivative. These functional groups include, for example, carboxyl, acid anhydride, carboxylic acid salt, alcoholic hydroxyl, phenolic hydroxyl, N-methylol, primary amino, secondary amino, tertiary amino, amido, sulfonic acid, mercaptan and urethane groups. Among the above-mentioned radical-polymerizable monomers, those having a functional group reactive with the epoxy group are particularly preferred, since the resulting graft polymers are highly reactive with the epoxy compounds. These radical-polymerizable monomers include, for example, hydroxyethyl acrylate, hydroxyethyl methacrylate, hydroxypropyl acrylate, hydroxypropyl methacrylate, polyethylene glycol monomethacrylate, polypropylene glycol monomethacrylate, dimethylaminoethyl methacrylate, diethylaminoethyl methacrylate, N-methylolacrylamide, methoxymethylacrylamide, butoxymethylacrylamide, methylolmethacrylamide, acrylic acid, methacrylic acid, crotonic acid, fumaric acid, maleic acid, glycidyl methacrylate, glycidyl acrylate, styrenesulfonic acid and sodium styrenesulfonate.

The hydrophilic epoxy compounds to be used as the crosslinking agent in the present invention include both relatively low molecular weight epoxy compounds and polymers having an epoxy group.

The term "hydrophilic epoxy compound" as used herein refers to an epoxy compound of which at least 50 wt. % can be dissolved in water or dispersed therein to form a substantially homogeneous dispersion, when 1 g of the compound is dissolved in 10 g of water.

The hydrophilic epoxy compounds include compounds such as ethylene glycol diglycidyl ether, polyethylene glycol diglycidyl ether, propylene glycol diglycidyl ether, polypropylene glycol diglycidyl ether, glycerol polyglycidyl ether, diglycerol polyglycidyl ether, polyglycerol polyglycidyl ether, sorbitol polyglycidyl ether, and diglycidyldimethylhydantoin; water-soluble resins such as o-cresol novolak-type epoxy resin and copolymers comprising an epoxy group-containing radical-polymerizable monomer such as glycidyl methacrylate, glycidyl acrylate or allyl glycidyl ether and an $\alpha,\beta$-ethylenically unsaturated acid such as acrylic or methacrylic acid, or a radical-polymerizable hydrophilic monomer such as a hydroxyalkyl (meth)acrylate, for example, 2-hydroxyethyl (meth)acrylate or 2-hydroxypropyl (meth)acrylate, or N-vinyl-2-pyrrolidone.

The hydrophilic epoxy compounds may be added to the graft copolymer by a known process. For example, the hydrophilic epoxy compound of 100% concentration may be added to the coating liquid containing the graft copolymer or, alternatively, the hydrophilic epoxy compound may be diluted with a solvent such as ethanol or methyl ethyl ketone and/or water to a suitable concentration before the addition.

The coating liquid containing the graft copolymer may be mixed with the hydrophilic epoxy compound by an ordinary mixing means such as an agitating mixer, e.g. Disper Mill. It is preferred to prepare the mixture 0 to 12 h before the precoating of the support with the resin of the invention.

The mixing ratio of the graft polymer to the hydrophilic epoxy compound is determined depending on the amount of the functional group reactive with the epoxy group contained in the graft polymer molecule. Generally, 100 parts by weight of the graft polymer is mixed with 0.5 to 50 parts by weight, preferably 5 to 20 parts by weight, of the hydrophilic epoxy compound. When the amount of the hydrophilic epoxy compound, is smaller than 0.5 parts by weight, the crosslinking effects of the epoxy compound is insufficient and, on the other hand, when this amount exceeds 50 parts by weight, the relative amount of the cellulose derivative in the resin forming the precoat layer becomes insufficient and it becomes impossible to obtain the intended precoating resin composition which realizes a good adhesion between the support and the photosensitive layer, an excellent face strength and prevention of the devitrification in the developing step without deteriorating the photographic properties.

A blend of the graft polymer comprising at least one radical-polymerizable unsaturated monomer bonded with the cellulose derivative and the hydrophilic epoxy compound used as the crosslinking agent according to the present invention has characteristic features which cannot be attained in the conventional resin compositions.

For example, a mere blend of a cellulose derivative such as cellulose acetate butyrate and a polymer of a radical-polymerizable monomer has a defect that it cannot be endowed with hardness or toughness of the coating film characteristic to cellulose acetate butyrate. However, this defect can be overcome by replacing the blend with the graft polymer. Further, by reacting the graft polymer with the crosslinking agent, the water resistance and the adhesion between the photosensitive layer and the support can be improved.

In the photosensitive material, the photosensitive layer, the top layer, may be formed conventionally. A known photosensitive composition may be used in forming the photosensitive layer of the diazo reproducing material of the present invention. Particularly, a two-component photosensitive layer comprising a diazo compound and a coupler is preferred.

The two-component photosensitive layer may contain, if necessary, a resin binder.

When water is used as a medium, a binder contained in the photosensitive layer is preferably an aqueous emulsion of a water-soluble high molecular substance such as gelatin, hydroxyethylcellulose or polyacrylamide or other high molecular substances.

When an organic solvent such as an alcohol, aromatic hydrocarbon, ketone, acetic acid ester, cellosolve or dimethylformamide is used as the medium, a high molecular compound soluble in the solvent is used as the binder. These high molecular compounds include, for example, cellulose acetate, cellulose acetate butyrate, cellulose acetate propionate, ethylcellulose, hydroxyethylcellulose and polyalkyl acrylates.

The photosensitive layer of the present invention may contain a coupling inhibitor for preventing a coupling reaction prior to developing. The coupling inhibitors include, for example, citric acid, tartaric acid, sulfosalicylic acid and p-toluenesulfonic acid. The photosensitive layer may further contain an antioxidant such as thiourea or diphenylthiourea and various other additives such as U.V. absorber, surfactant and antistatic agents depending on the use.

The supports to be used in the present invention include various, plastic films such as polyethylene terephthalate, polypropylene, polycarbonate and cellulose acetate films. The application methods for forming the photosensitive layer or precoat layer include, for example, immersion method, flow method, rolling method, doctor knife method, air knife method and spray method.

According to the invention, the photosensitive layer may be improved by using a coupler and a benzenediazonium hexafluorophosphate in combination.

The couplers usable in the present invention include resorcinol, α- or β-resorcylic acid, hydroxyalkoxy-substituted phenols, β-naphthol derivatives and other known couplers.

The benzenediazonium hexafluorophosphate derivatives used as the diazo compound in forming the photosensitive layer according to the present invention are not particularly limited. They include, for example, the following compounds:

4-N,N-dimethylaminobenzenediazonium hexafluorophosphate,
4-N,N-diethylaminobenzenediazonium hexafluorophosphate,
4-N-ethyl-N-hydroxyethylaminobenzenediazonium hexafluorophosphate,
4-methyl-N-hydroxyethylaminobenzenediazonium hexafluorophosphate,
4-N-ethylaminobenzenediazonium hexafluorophosphate,
4-N,N-diethylamino-2-methylbenzenediazonium hexafluorophosphate,
4-N-ethyl-N-benzylaminobenzenediazonium hexafluorophosphate,
4-N,N-diethylamino-3-chlorobenzenediazonium hexafluorophosphate,
4-N-morpholino-2,5-diethoxybenzenediazonium hexafluorophosphate,
4-(p-tolylthio)-2,5-diethoxybenzenediazonium hexafluorophosphate,
4-(p-chlorophenoxy)-2,5-diethoxybenzenediazonium hexafluorophosphate,
4-(p-ethoxyphenyl)-2,5-diethoxybenzenediazonium hexafluorophosphate,
4-N,N-bis(β-hydroxyethyl)aminobenzenediazonium hexafluorophosphate,
4-N-pyrrolidino-3-methylbenzenediazonium hexafluorophosphate,
4-N-morpholinobenzenediazonium hexafluorophosphate,
4-N-(2,6-dimethylmorpholino)benzenediazonium hexafluorophosphate,
4-N-piperidinobenzenediazonium hexafluorophosphate,
4-N-pyrrolidinobenzenediazonium hexafluorophosphate,
4-N-hexamethyleneiminobenzenediazonium hexafluorophosphate,
4-N-piperidinobenzenediazoniun hexafluorophosphate,
4-N-(N'-methylpiperidino)benzenediazonium hexafluorophosphate,
4-N-[N-(3-azabicyclo-3,2,2-nonane)]benzenediazonium hexafluorophosphate,
4-N-[N'-(β-hydroxyethyl)piperidino]benzenediazonium hexafluorophosphate, and
4-N-(N'-acetylpiperidino)benzenediazonium hexafluorophosphate.

The invention provides the before mentioned advantageous effects to overcome the problems in the state of art. In addition, the preferable embodiment of the invention using the epoxy compound provides some advantages such that the resulting material has excellent adhesion between the support and the photosensitive layer; and has a high film strength; it is free from devitrification in the developing step; and photographic properties thereof are very stable.

In the second, preferable embodiment of the invention where a coupler and a benzenediazonium hexafluorophosphate derivative are used in combination in the photosensitive layer, such a diazonium compound is selected for a high sensitivity and a high storage stability and connection of the compound with the precoat according to the invention may maintain the above mentioned advantages as they are.

The following Preparative Examples and Examples will further illustrate the present invention. In the examples, parts are given by weight.

PREPARATIVE EXAMPLE 1

100 parts of methyl ethyl ketone was charged in a reactor provided with a stirrer, monomer-dropping means, reflux condenser, temperature regulator and thermometer and heated to 60° C. 15 parts of cellulose acetate butyrate (CAB-551-0.2; a product of Eastman Chemical Co.) was dissolved therein. The resulting solution was heated to 80° C. Then, 3 parts of maleic anhydride and 0.2 part of pyridine were added to the solution and the mixture was stirred at 80° C. for 3 h to carry out the reaction. A monomeric mixture of 24 parts of styrene, 50 parts of methyl methacrylate, 10 parts of acrylic acid and 7 parts of benzoyl peroxide was added dropwise thereto over 1 h. After completion of the addition, the polymerization was continued at 80° C. for 4 h. A monomeric mixture of 57 parts of methyl methacrylate, 50 parts of ethyl acrylate, 45 parts of n-butyl acrylate, 15 parts of 2-hydroxyethyl methacrylate, 13 parts of acrylic acid and 10 parts of benzoyl peroxide was added dropwise to the reaction mixture at 80° C. over 2 h. The resulting mixture was heated to 80° C. for 8 h to obtain a cellulose graft polymer solution.

PREPARATIVE EXAMPLE 2

100 parts of the cellulose graft polymer solution obtained in Preparative Example 1 was stirred thoroughly together with 146 parts of water and 3.5 parts of triethylamine to obtain a bluish white, transparent aqueous dispersion having a viscosity of 38 cP and a solid content of 30%.

PREPARATIVE EXAMPLE 3

200 parts of cellulose acetate propionate (CAP 504-0.2; a product of Eastman Chemical Co.) and 300 parts of 2-butoxyethanol were charged in the same reactor as in Preparative Example 1 and thoroughly stirred under heating to 100° C. to obtain a homogeneous solution. A mixture of 46 parts of methyl methacrylate, 54 parts of n-butyl methacrylate and 3 parts of benzoyl peroxide was added dropwise to the solution over 2 h. After completion of the addition, the polymerization reaction was continued at 100° C. for 5 h. 150 parts of 2-butoxyethanol was added to the mixture to obtain a cellulose graft polymer solution having a solid content of 40%.

EXAMPLE 1

The graft polymer solution obtained in the above Preparative Example 1 was applied onto a polyethylene terephthalate film by means of a bar coater and then dried at 80° C. for 30 min to form a precoat layer. The application rate was 2 g/m² (as solid).

Then, a photosensitive liquid having the following composition was applied onto the precoat layer and dried by slowly elevating the temperature from 30° C. to 80° C. The application rate was 6 g/m².

Composition of the photosensitive liquid:
methyl ethyl ketone: 40 ml
methanol: 40 ml
methylcellosolve: 20 ml
cellulose acetate propionate: 6.0 g
sulfosalicylic acid: 3.0 g
4-di-n-butylamino-3-chlorobenzenediazonium tetrafluoroborate: 4.0 g
2-(o-hydroxyphenoxy)ethanol 1.5 g An original was placed on the resulting diazo reproducing material. After exposure to a light of a high-pressure mercury lamp of 2 kW for 30 sec followed by development with ammonia fumes, a sepia image was obtained.

The UV density of the resulting image was determined by means of a Macbeth densitometer (with a Wratten 18 A filter) to reveal that the maximum density $D_{max}$ was 3.5 and the minimum density $D_{min}$ was 0.15. The image area had a good light screening property and the non-image area had a high transparency. Further, the resulting image was exposed to a light of a fadeometer for about 10 h to examine the weather resistance. No change in the $D_{max}$ nor $D_{min}$ was recognized to reveal that it had an excellent weather resistance. The adhesion between the precoat layer and the photosensitive layer or support was also excellent and the face strength was sufficient.

EXAMPLE 2

The aqueous dispersion obtained in Preparative Example 2 was applied onto a polyethylene terephthalate film and then a photosensitive liquid having the following composition was applied thereto in the same manner as in Example 1 to obtain a diazo photosensitive material.

Composition of photosensitive liquid:
methyl ethyl ketone: 40 ml
methanol: 40 ml
methylcellosolve: 20 ml
cellulose acetate propionate: 6.0 g
sulfosalicylic acid: 3.0 g
4-di-n-butylamino-3-chlorobenzenediazonium tetrafluoroborate: 4.0 g
3-(o-hydroxyphenoxy)propanol: 1.5 g The thus obtained diazo reproducing material was exposed and developed and then the density was determined in the same manner as in Example 1 to obtain a clear sepia image having a density of as high as $D_{max}=3.4$ and $D_{min}=0.16$. The face strength was sufficient.

EXAMPLE 3

The graft polymer solution obtained in Preparative Example 3 was applied onto a cellulose triacetate film at such a rate that the application rate after drying would be 2 g/m². Then, a photosensitive liquid having the following composition was applied thereto at a rate of 6 g/m² (after drying) and then dried to obtain a diazo reproducing material.

Composition of photosensitive liquid:
acetone: 20 ml
methanol: 80 ml
tartaric acid: 4.0 g
4-diethylaminobenzenediazonium tetrafluoroborate: 3.5 g
2-(o-hydroxyphenoxy)ethanol: 1.5 g The resulting diazo reproducing material was exposed and developed in the same manner as in Example 1 to obtain a clear sepia image having a high density. The face strength was sufficient.

COMPARATIVE EXAMPLE 1

A solution of the following composition was applied onto a polyethylene terephthalate film at a rate of 2 g/m² (after drying) to form a precoat layer. The same diazo photosensitive liquid as in Example 1 was applied thereto at a rate of 6 g/m² (after drying).

Composition of precoat solution
- cellulose acetate butyrate (butyration degree 37%, acetylation degree 18%, hydroxylation degree 2%): 1 g
- polyethyl methacrylate (molecular weight: 500,000): 4.5 g
- acetone 50 ml
- methanol: 20 ml
- methylcellosolve: 80 ml When the resulting film was exposed, stripping was observed in an exposed area. This phenomenon was thought to be caused because the composition forming the precoat layer is partially transferred and penetrates into the photosensitive layer at the interface between the precoat layer and the diazo photosensitive layer to reduce the penetrability of nitrogen gas formed ih the exposing step.

In the developing step, a non-exposed area became turbid, resulting in devitrification.

PREPARATION EXAMPLE 4

150 parts of cellosolve acetate containing 0.5% of N,N-dimethylbenzylamine was charged in a reactor provided with a stirrer, reflux condenser, dropping funnel and thermometer. After heating to 80° C., 15 parts of cellulose acetate butyrate (CAB 551-0.2; a product of Eastman Chemical Co.) was added thereto to obtain a solution. Then, 5 parts of glycidyl methacrylate containing 0.4% of p-tertbutylcatechol was added to the solution and the mixture was heated to 120° C. to carry out the reaction for 5 h.

The temperature in the system was lowered to 90° C. A mixture of 36 parts of ethyl acrylate, 81 parts of methyl methacrylate, 84 parts of 2-ethylhexyl methacrylate, 60 parts of acrylic acid, 50 parts of methyl ethyl ketone and 23 parts of benzoyl peroxide was added to the mixture dropwise over 2 h, and the reaction was continued for additional 6 h.

After completion of the reaction, the reaction mixture was cooled to 30° C. 84 parts of triethylamine and 435 parts of water were added to the mixture and stirred to obtain an aqueous dispersion of a graft polymer having a solid content of 28.1%, pH of 7.2 and viscosity of 280 cP (at 30° C.).

PREPARATION EXAMPLE 5

15 parts of cellulose acetate propionate (CAP, 504-0.2; a product of Eastman Chemical Co.) and 100 parts of methyl ethyl ketone were charged in the same reactor as in Preparation Example 4 and heated to 60° C. to obtain a solution. The solution was heated to 80° C. 3 parts of maleic anhydride and 0.2 part of pyridine were added thereto and the reaction was continued for 3 h. A mixture of 24 parts of styrene, 50 parts of methyl methacrylate, 10 parts of acrylic acid and 7 parts of benzoyl peroxide was added dropwise thereto over 1 h. After completion of the addition, the reaction was continued at 80° C. for 4 h. Further, a mixture of 57 parts of methyl methacrylate, 50 parts of ethyl acrylate, 45 parts of butyl acrylate, 15 parts of 2-hydroxyethyl methacrylate, 13 parts of acrylic acid, 10 parts of benzoyl peroxide and 164.8 parts of methyl ethyl ketone was added drop-wise thereto over 2 h. The polymerization reaction was carried out at 80° C. for additional 8 h to obtain a solution of a graft polymer having a solid content of 49.9% and viscosity of 1680 cP (at 30° C.).

PREPARATION EXAMPLE 6

146 parts of water and 3.5 parts of triethylamine were added to 100 parts of the graft polymer solution obtained in Preparation Example 5 and the mixture was stirred thoroughly to obtain a white aqueous dispersion having a solid content of 17.8% and viscosity of 23 cP (at 30° C.).

EXAMPLE 4

5 parts of Denacol EX-313 (a hydrophilic epoxy compound of Nagase Sangyo Co., Ltd.) was added to 100 parts of the aqueous graft polymer dispersion obtained in Preparation Example 4 and the mixture was stirred thoroughly. The mixture was applied to a polyethylene terephthalate film uniformly at a rate of 2 g/m² (after drying) and then dried at 100° C. for 20 min to form a precoat layer of a diazo reproducing film.

Then, a photosensitive liquid having the following composition was applied to the precoat layer and dried by slowly elevating the temperature from 30° C. to 80° C. 6 g/m² of a photosensitive layer was obtained.

Composition of the photosensitive liquid:
- methyl ethyl ketone: 40 ml
- methanol: 40 ml
- methylcellosolve: 20 ml
- cellulose acetate propionate: 6.0 g
- sulfosalicylic acid: 3.0 g
- 4-di-n-butylamino-3-chlorobenzenediazonium tetrafluoroborate: 4.0 g
- 2-(o-hydroxyphenoxy)ethanol: 1.5 g An original was placed on the resulting diazo reproducing material. After exposure to a light of a high-pressure mercury lamp of 2 kW for 30 sec followed by development with ammonia fumes, a sepia image was obtained.

The UV density of the resulting image was determined by means of a Macbeth densitometer (with a Wratten 18 A filter) and then the adhesion between the photosensitive material layer and the polyethylene terephthalate film was examined.

Further, the resulting image was exposed to a light of a fadeometer for about 10 h to examine the weather resistance. The results are shown in Table 1.

EXAMPLE 5 to 8

100 parts of the aqueous graft polymer dispersion obtained in Preparation Example 4 was mixed with Denacol EX-313 (a hydrophilic epoxy compound) in an amount shown in the following table. A precoat layer was formed in the same manner as in Example 4.

|  | Example 5 | Example 6 | Example 7 | Example 8 |
| --- | --- | --- | --- | --- |
| Denacol EX-313 | 1.5 parts | 2 parts | 4 parts | 14 parts |

Then, a photosensitive layer was formed in the same manner as in Example 4 and the resulting diazo reproducing material was examined in the same manner as in Example 4. The results are shown in Table 1.

TABLE 1

| Properties of diazo reproducing materials | | | | | |
|---|---|---|---|---|---|
| | Ex. 4 | Ex. 5 | Ex. 6 | Ex. 7 | Ex. 8 |
| UV density | | | | | |
| Maximum density ($D_{max}$) | 3.25 | 3.23 | 3.31 | 3.29 | 3.21 |
| Minimum density ($D_{min}$) | 0.16 | 0.14 | 0.14 | 0.15 | 0.16 |
| Adhesion | good | good | good | good | good |
| Weather resistance UV density | | | | | |
| Maximum density ($D_{max}$) | 3.25 | 3.22 | 3.30 | 3.29 | 3.20 |
| Minimum density ($D_{min}$) | 0.16 | 0.14 | 0.14 | 0.15 | 0.17 |

EXAMPLE 9

100 parts of the graft polymer solution obtained in Preparation Example 5 was thoroughly stirred together with a liquid mixture of 5 parts of Denacol EX-811 (a hydrophilic epoxy compound) and 10 parts of methyl ethyl ketone. The resulting liquid was applied to a polyethylene terephthalate film uniformly at a rate of 1 to 3 g/m² (after drying) and then dried at 80° C. for 30 min to form a precoat layer.

A photosensitive liquid having the following composition was applied to the obtained precoat layer at a rate of 6 g/m² (after drying) and then dried to obtain a diazo reproducing material.

Composition of the photosensitive liquid:
 acetone: 20 ml
 methanol: 80 ml
 tartaric acid: 4.0 g
 thiourea: 1.0 g
 4-diethylaminobenzenediazonium tetrafluoroborate: 3.5 g
 2-(o-hydroxyphenoxy)ethanol: 1.5 g The resulting diazo reproducing material was exposed and developed in the same manner as in Example 4. The adhesion between the photosensitive layer and polyethylene terephthalate film was excellent. A sepia image having an excellent face strength and a high density was obtained.

EXAMPLE 10

100 parts of the aqueous dispersion obtained in Preparation Example 6 was thoroughly stirred together with 2.7 parts of Denacol EX-421 (a hydrophilic epoxy compound). The resulting liquid was applied uniformly onto a polyethylene terephthalate film at a rate of 1.5 g/m² (after drying) and then dried at 80° C. for 30 min to obtain a precoat layer.

Then, a photosensitive layer was formed in the same manner as in Example 9 to obtain a diazo reproducing material.

After the exposure and development effected in the same manner as in Example 4 using the thus obtained diazo reproducing material, an excellent image similar to that obtained in Example 9 was obtained.

PREPARATION EXAMPLE 7

50 parts of cellulose acetate propionate (CAP 504-0.2; a product of Eastman Chemical Co.), 20 parts of 2-butoxyethanol and 30 parts of toluene were charged in the same reactor as in Preparation Example 1 and thoroughly stirred under heating to 100° C. to obtain a homogeneous solution. A mixture of 20 parts of styrene, 20 parts of methyl methacrylate, 47 parts of ethyl acrylate, 1 part of acrylic acid, 12 parts of 2-hydroxyethyl methacrylate, 50 parts of toluene and 2 parts of benzoyl peroxide was added dropwise to the solution over 3 h. After completion of the addition, the polymerization reaction was continued for 3 h to obtain a graft polymer solution having a solid content of 50%.

PREPARATION EXAMPLE 8

150 parts of ethylene glycol monoethyl ether acetate containing 0.5% of N,N-dimethylbenzylamine was charged in a reactor provided with a stirrer, reflux condenser, dropping means and thermometer and heated to 80° C. 15 parts of cellulose acetate butyrate (CAB 381-0.5; a product of Eastman Chemical Co.) was dissolved therein and 5 parts of glycidyl methacrylate containing 0.4% of p-tertbutylcatechol was added to the solution. The temperature was elevated to 120° C. and the reaction was carried out for 5 h. Then, the temperature of the system was lowered to 90° C. A mixture of 36 parts of ethyl acrylate, 81 parts of methyl methacrylate, 84 parts of 2-ethylhexyl methacrylate, 51 parts of acrylic acid, 9 parts of maleic anhydride, 50 parts of 2-butanone and 23 parts of benzoyl peroxide was added dropwise in a nitrogen atmosphere over 2 h. The reaction was continued for additional 6 h. Then, the reaction mixture was cooled to 30° C. 60 parts of triethylamine and 436 parts of ion-exchanged water were added thereto to obtain an aqueous dispersion of a cellulose graft polymer having a solid content of 32%, pH of 7.8 and viscosity of 140 cP (at 30° C.).

EXAMPLE 11

The solution obtained in Preparative Example 1 was applied onto a polyethylene terephthalate (PET) film by means of a bar coater and then dried at 80° C. for 30 min to form a precoat layer. The application rate was 2 g/m².

Then, a photosensitive liquid having the following composition was applied to the precoat layer and dried by slowly elevating the temperature from 30° C. to 80° C. The application rate was 6 g/m².

Composition of the photosensitive liquid:
 methyl ethyl ketone 40 ml
 methanol: 40 ml
 methylcellosolve: 20 ml
 cellulose acetate propionate: 6.0 g
 sulfosalicylic acid: 3.0 g
 4-diethylaminobenzenediazonium hexafluorophosphate: 4.0 g
 2-(o-hydroxyphenoxy)ethanol: 1.5 g An original was placed on the resulting diazo reproducing material. After exposure to a light of a high-pressure mercury lamp of 2 kW for 30 sec followed by development with ammonia fumes, a sepia image was obtained.

The U.V. density of the resulting image was determined by means of a Macbeth densitometer (with a Wratten 18 A filter) to reveal that the maximum density $D_{max}$ was 3.5 and the minimum density $D_{min}$ was 0.15. The image area had a good light-screening property and the non-image area had a high transparency. In tape tests, excellent results were obtained. The adhesion between the precoat layer and PET or photosensitive layer was also excellent.

Further, the resulting image was exposed to a light of a fadeometer for about 10 h to examine the weather resistance. No change in the $D_{max}$ nor $D_{min}$ was recognized to reveal that it had an excellent weather resistance. The same tests as above were effected one month after the preparation of the reproducing material but no change was recognized.

EXAMPLE 12

The aqueous dispersion obtained in Preparative Example 2 was applied onto a polyethylene terephthalate film at a rate of 2 g/m² (after drying) and then a photosensitive liquid having the following composition was applied thereto at a rate of 6 g/m² (after drying) and then dried to obtain a diazo photosensitive material.
Composition of photosensitive liquid:
  acetone: 20 ml
  methanol: 80 ml
  tartaric acid: 4.0 g
  thiourea: 1.0 g
  4-diethylaminobenzenediazonium hexafluorophosphate: 3.5 g
  2-(o-hydroxyphenoxy)ethanol: 1.5 g The resulting diazo reproducing material was exposed and developed in the same manner as in Example 11 to obtain a clear sepia image having a high density. The same tests as above were effected after one month but no change was recognized.

EXAMPLE 13

20 parts by weight of hexamethoxymethylmelamine was added to 200 parts by weight of the solution obtained in Preparation Example 7 and the mixture was stirred for 30 min. The resulting mixture was applied onto a polyethylene terephthalate film by means of a bar coater and then dried at 80° C. for 30 min to form a precoat layer.

Then, the same procedure as in Example 11 was repeated to obtain a diazo reproducing material. After the development effected in the same manner as in Example 11, a clear image equivalent to that obtained in Example 11 was obtained. The face strength was superior to that obtained in Example 11.

EXAMPLE 14

20 parts of hexamethoxymethylmelamine was added to 250 parts by weight of the aqueous dispersion obtained in Preparation Example 8 and the mixture was stirred for 30 min. The mixture was applied onto a polyethylene terephthalate film by means of a bar coater and then dried at 80° C. for 30 min to form a precoat layer.

Then, the same procedure as in Example 12 was repeated to obtain a diazo reproducing material. After the development effected in the same manner as in Example 12, a clear image equivalent to that obtained in Example 12 was obtained. The face strength was superior to that obtained in Example 12.

COMPARATIVE EXAMPLE 2

A solution of the following composition was applied onto a polyethylene terephthalate film at a rate of 2 g/m² (after drying) to form a precoat layer. The same diazo photosensitive solution as in Example 11 was applied thereto at a rate of 6 g/m² (after drying).
Composition of precoating solution:
  cellulose acetate butyrate (butyration degree 37%, acetylation degree 18%, hydroxylation degree 2%): 1 g
  polymethyl methacrylate (molecular weight: 200,000): 2.5 g
  polyethyl methacrylate (molecular weight: 500,000): 2.0 g
  hexamethoxymethylmelamine: 1 g
  acetone: 50 ml
  methanol: 20 ml
  methylcellosove: 80 ml When the resulting film was exposed, partial stripping was observed. After the exposure and development steps, it was found that the exposed area of the film was yellowed, since the area did not go with the decomposition of the diazonium compound.

The embodiments of the invention in which an exclusive property or privilege is claimed are defined as follows:

1. In a photosensitive diazotype reproducing material which comprises a polyethylene terephthalate support film, a precoat layer coated on said support film and a light-sensitive layer coated on said precoat layer, said light-sensitive layer comprising a light-sensitive diazonium compound, the improvement which comprises: said precoat layer consists essentially of a graft polymer which has been prepared by polymerizing from 70 to 99 wt. % of at least one radical-polymerizable monomer capable of grafting to a cellulose derivative, in the presence of from 1 to 30 wt. % of a cellulose derivative selected from the group consisting of cellulose ethers, cellulose esters and mixture thereof, under radical polymerization conditions, to form said graft polymer, said precoat layer being effective to firmly attach said light-sensitive layer to said support film.

2. A reproducing material as claimed in claim 1, in which the amount of said precoat layer on said support film is from 1 to 3 g/m², calculated as the solids.

3. A reproducing material as claimed in claim 1, in which said monomer is selected from the group consisting of acrylic esters, methacrylic esters, acrylic amides, methacrylic amides, vinyl aromatic monomers, vinyl monomers having a functional group, vinyl acetate, ethylene, butadiene, chloroprene, isoprene, acrylonitrile, vinyl chloride and vinyl carboxylates.

4. A reproducing material as claimed in claim 1, in which said monomer is selected from the group consisting of compounds having the formula:

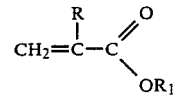

wherein R represents hydrogen or methyl and R₁ represents alkyl having 1 to 20 carbon atoms, cycloalkyl having 3 or 4 carbon atoms, methoxybutyl, ethoxybutyl, phenyl, benzyl, allyl, hydroxyalkyl group having 2 or 3 carbon atoms, dicyclopentynyl, polyalkylene glycol, acrylamide, N-methlolacrylamide and N-alkoxyacrylamides, compounds having the formula:

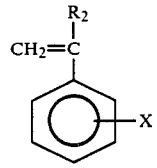

wherein R₂ represents hydrogen or methyl and X represents hydrogen, halogen, methyl, nitro, amino, N-dialkylamino or chloromethyl group, glycidyl methacrylate, glycidyl acrylate, allyl glycidyl ether, acryloyl chloride, methacryloyl bromide, acrylic acid, methacrylic acid, maleic anhydride and fumaric acid, and vinyl acetate, ethylene, butadiene, chloroprene, isoprene, acrylontrile, vinyl chloride and vinyl carboxylate.

5. A reproducing material as claimed in claim 1, in which said graft polymer has been prepared using a radical-polymerizable monomer containing a hydroxyl, amidomethylol, carboxyl or glycidyl group, and said polymer has been cross-linked by incorporating in said precoat layer a cross-linking agent selected from the group consisting of amino resins, epoxy coupounds and polyisocyanate compounds, said cross-linking agent containing at least two functional groups that are reactive with said hydroxyl, amidomethylol, carboxyl or glycidyl groups on said monomer.

6. A reproducing material as claimed in claim 1, in which said graft copolymer contains a functional group reactive with an epoxy group, and wherein said graft polymer has been cross-linked by incorporating in said precoat layer a hydrophilic epoxy compound which is effective as a cross-linking agent reactive with said graft polymer, the amount of said hydrophilic epoxy compound being from 0.5 to 50 parts by weight, per 100 parts by weight of said graft polymer.

7. A reproducing material as claimed in claim 1, in which said light-sensitive layer contains a coupler and a benzenediazonium hexafluorophosphate compound as said light-sensitive diazonium compound.

8. A reproducing material as claimed in claim 1, in which said light-sensitive layer is an acid-stabilized, two-component, diazotype, light-sensitive layer.

9. A reproducing material a claim in claim 1, claim 2, claim 3, claim 4, claim 5, claim 6, claim 7, or claim 8, in which said cellulose derivatives is a cellulose ester selected from the group consisting of cellulose acetate, cellulose acetate propionate, cellulose acetate butyrate, cellulose nitrate and cellulose sulfate.

10. A reproducing material as claimed in claim 1, in which said cellulose derivative is cellulose acetate propionate or cellulose acetate butyrate.

* * * * *